(12) United States Patent
Sevindik

(10) Patent No.: US 11,025,493 B2
(45) Date of Patent: Jun. 1, 2021

(54) SMALLCELL NETWORK DEPLOYMENT, OPTIMIZATION AND MANAGEMENT BASED ON BLOCKCHAIN TECHNOLOGY

(71) Applicant: Volkan Sevindik, Reston, VA (US)

(72) Inventor: Volkan Sevindik, Reston, VA (US)

(*) Notice: Subject to any disclaimer, the term of this patent is extended or adjusted under 35 U.S.C. 154(b) by 107 days.

(21) Appl. No.: 16/017,802

(22) Filed: Jun. 25, 2018

(65) Prior Publication Data

US 2019/0394091 A1 Dec. 26, 2019

Related U.S. Application Data

(60) Provisional application No. 62/707,705, filed on Nov. 14, 2017.

(51) Int. Cl.
*H04L 12/24* (2006.01)
*H04L 12/911* (2013.01)
*G06Q 30/06* (2012.01)

(52) U.S. Cl.
CPC ..... *H04L 41/0893* (2013.01); *G06Q 30/0645* (2013.01); *H04L 41/0823* (2013.01); *H04L 41/0896* (2013.01); *H04L 47/70* (2013.01)

(58) Field of Classification Search
CPC ............ H04L 41/0893; H04L 41/0823; H04L 41/0896; H04L 47/70
See application file for complete search history.

(56) References Cited

U.S. PATENT DOCUMENTS 10,299,128 B1* 5/2019 Suthar ............... G06Q 20/065
10,678,598 B2* 6/2020 Christidis ............ G06Q 20/38
2018/0103379 A1* 4/2018 Smith ................ H04W 16/14
2019/0026234 A1* 1/2019 Harnik ............. H04L 63/0428
2019/0102850 A1* 4/2019 Wheeler ............ G06Q 20/102
2019/0109707 A1* 4/2019 Ajoy .................. H04L 9/0637

(Continued)

OTHER PUBLICATIONS

Yang, "BlocONet:Blockchain-based Trusted Cloud Radio over Optical Fiber Network for 5G Fronthaul", Optical Fiber Communication Conference 2018, Mar. 2018.*

(Continued)

*Primary Examiner* — Todd L Barker
(74) *Attorney, Agent, or Firm* — Leyendecker & Lemire LLC

(57) ABSTRACT

Smallcell network is deployed, optimized and managed using blockchain technology. Smallcells create and mine a new coin called smallcell coin. All transactions in the network and/or between network and users are paid using smallcell coin which can also be converted to any other cryptocurrency. Each smallcell configures itself based on pre-determined parameters. Each smallcell talks with other smallcells in the network, and each communication is recorded as part of the block in smallcell blockchain. Smallcell Media Access Control layer unique identification number is used as private key, and product identification number is used as public key in recording the transactions in blockchain. Performance ledger is used during small cell network optimization to record any transaction in the blockchain. User terminals (subscribers) and smallcells sign smart contract when users terminal requests to make connection with smallcell, and any payment between smallcell and user terminal will be made using smallcell coin.

23 Claims, 13 Drawing Sheets

(56) References Cited

U.S. PATENT DOCUMENTS

| | | | | |
|---|---|---|---|---|
| 2019/0182055 | A1* | 6/2019 | Christidis | G06F 9/00 |
| 2019/0182254 | A1* | 6/2019 | Christidis | H04L 63/1458 |
| 2019/0319861 | A1* | 10/2019 | Pan | H04L 41/5006 |
| 2019/0334726 | A1* | 10/2019 | Kelly | H04L 9/3239 |
| 2019/0349426 | A1* | 11/2019 | Smith | H04W 84/22 |
| 2019/0379664 | A1* | 12/2019 | Suthar | H04W 4/70 |

OTHER PUBLICATIONS

Ahmed-Rengers, "Don't Mine, Wait in Line: Fair and Efficient Blockchain Concensus with Robust Round Robin", May 2020.*

* cited by examiner

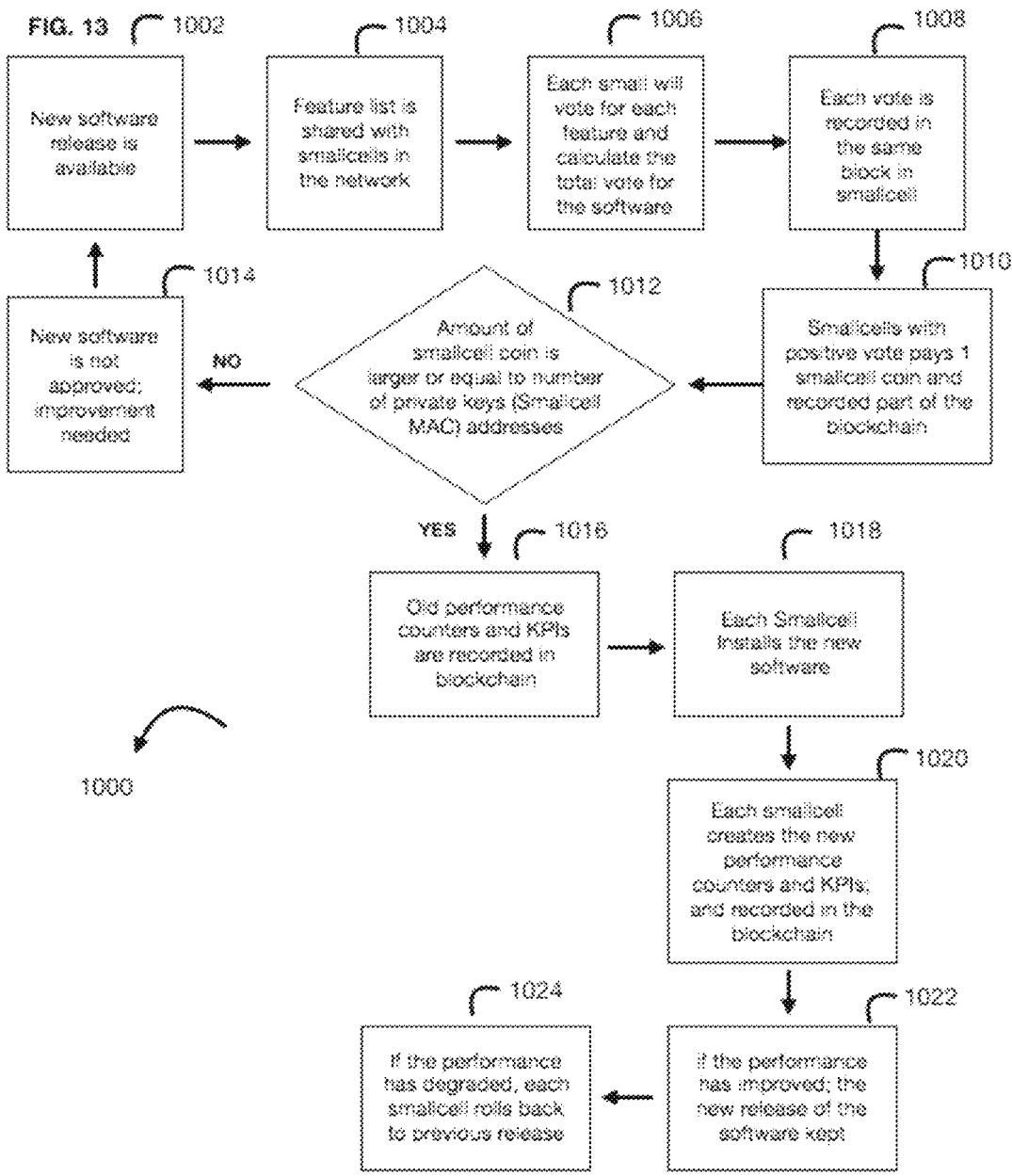

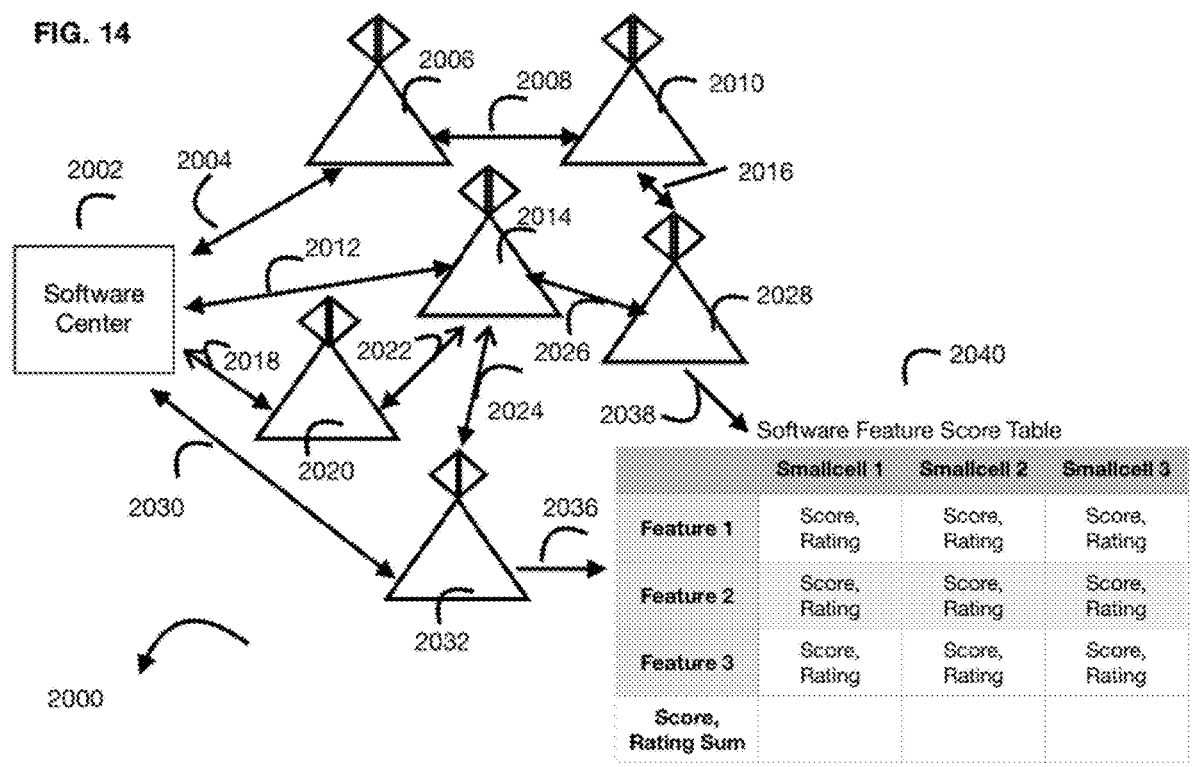

Fig. 15 Charging Ledger

| Time | Telephone No | IMSI | Smallcell ID | Smallcell Location (lat., long.) | Normal/ Emergency | Consumed Data Amount | Terminal Type & Quality of Service Class |
|---|---|---|---|---|---|---|---|
| 3002 | 3004 | 3006 | 3008 | 3010 | 3012 | 3014 | 3016 |

3000

Fig. 16 Performance Ledger

| Time | Telephone No | IMSI | Smallcell ID | Smallcell Location (lat., long.) | Quality Index | Consumed Data Amount | Terminal Type & Quality of Service Class |
|---|---|---|---|---|---|---|---|
| 4002 | 4004 | 4006 | 4008 | 4010 | 4012 | 4014 | 4016 |

4000

SMALLCELL NETWORK DEPLOYMENT, OPTIMIZATION AND MANAGEMENT BASED ON BLOCKCHAIN TECHNOLOGY

FIELD OF THE INVENTION

A method and apparatus for deploying, optimizing and managing smallcell network with blockchain technology is disclosed.

BRIEF DESCRIPTION OF DRAWINGS

FIG. 13 shows the process flow to upgrade the software of the smallcells in the network.

FIG. 14 shows the information exchange process between a software center and the smallcells in the network.

FIG. 15 shows a charging ledger for user terminal metrics.

FIG. 16 shows a performance ledger for user terminal metrics.

DETAILED DESCRIPTION OF THE INVENTION

While the present invention is described herein with reference to the illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

In the detailed description of embodiments that follows, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 1:
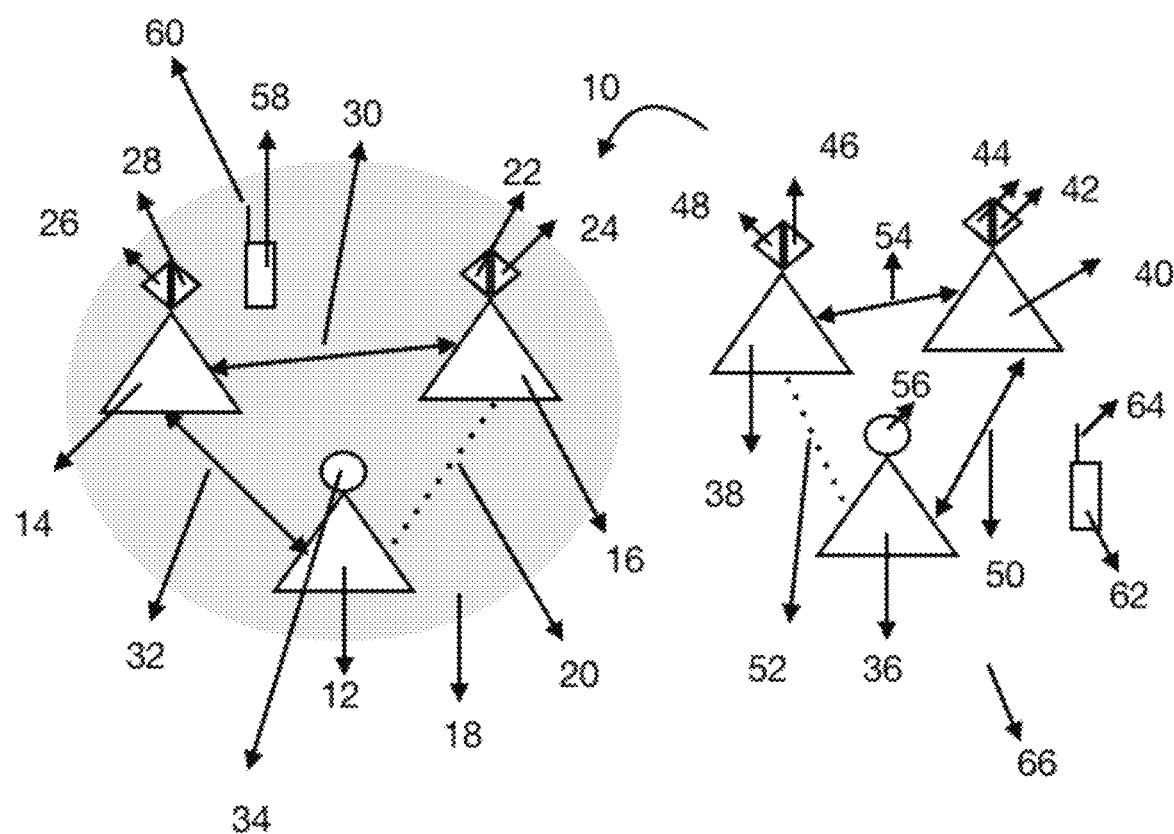
FIG. 1 is a schematic diagram showing an architecture of a smallcell network

Turning now to FIG. 1 an architecture 10 a smallcell network is shown. Smallcell communication devices 12, 14, 16. 36, 38, 40 are deployed at various locations randomly and/or at predetermined locations. A few smallcells can create a cluster 18. A cluster can be of any size, that is, a cluster of smallcells can contain any number of smallcells.

There may be smallcells in the network which are not inside and/or pan of any cluster 18. Any smallcell can have a wired 30, 32, 50, 54 and/or wireless connection 20, 52 to another smallcell in the same cluster and/or also with another smallcell in another cluster.

These inter-smallcell connections carry any kind of data between smallcells. Smallcell can have directional 22, 24, 26, 28, 42, 44, 46, 48 antennas and/or omnidirectional antennas 34, 56 to communicate with user terminals 58, 62. User terminals are wireless communication devices which communicate with smallcells devices' antennas 22, 24, 26, 28, 42, 44, 46, 48 using its own antennas 60, 64.

A user terminal can be any type of device which is authorized by the service operator and/or smallcell network. A user terminal carry an identification module called Subscriber Identity Module (SIM) card.

Figure 2:
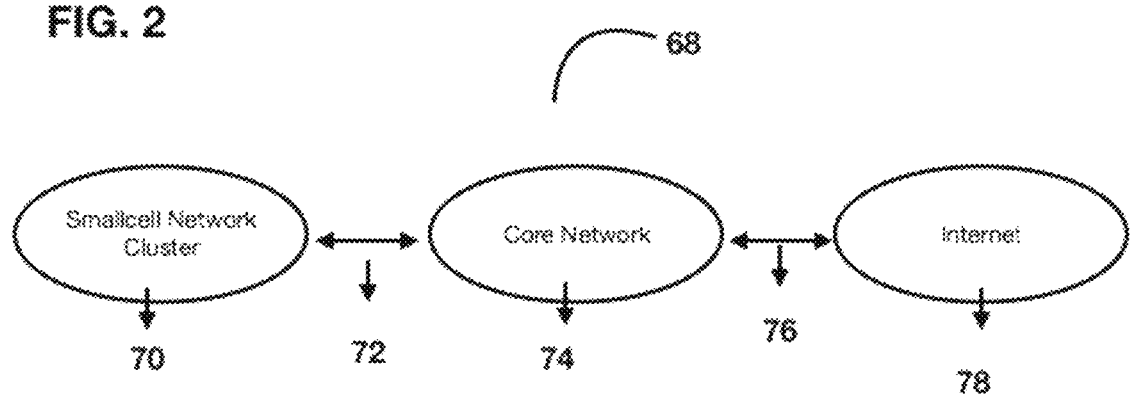
FIG. 2 is a flowchart showing the connection and communication between the smallcell network and the core network.

FIG. 2 shows 68, the connection and communication between the smallcell network and the core network 72. Communication link 72, between the smallcell network cluster 70 and the operator's core network 74, is capable of carrying any type of information in any format using any kind of communication protocol to core network 74 from smallcell network 70 and from core network 74 to smallcell network 70. Operator's core network 74 is connected to internet using a separate link 76. Link 76 carries any type of traffic in any format using any communication protocol.

Figure 3:
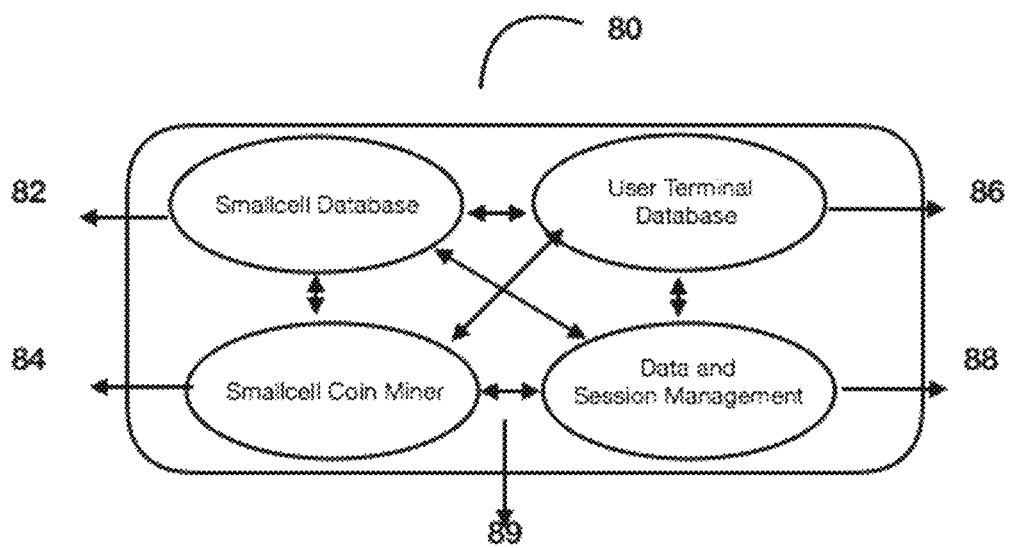
FIG. 3 is another flowchart diagram showing the internal components of the operator's core network.

FIG. 3 shows the internal components of the operator's core network. Smallcell Database 82, saves and stores all information about all smallcells in smallcell network. User Terminal Database saves and stores all information about user terminals which are connected to any smallcell in operator's network. Smallcell Coin Miner 84, mines smallcell coins, stores smallcell coins, shares smallcell coins with other smallcells in the smallcell network. Smallcell Coin Miner 84, also saves and stores all smallcell coin mining, and transaction history. This history consists of which smallcell(s) mined how many smallcell coins, at which time, and how many of these coins are spent and the reason for spending. For example, if a particular smallcell mined 100 smallcell coins on October, 7 between 4:00-5:00 AM (EST) at Fairfax country location and spent 25 of these 100 smallcell coins to rent a spectrum at the location or any other location, this record is saved in that format. Smallcell Database, User Terminal Database, Smallcell Coin Miner, Data and Session Management components (servers) are connected to each other 89.

Figure 4:
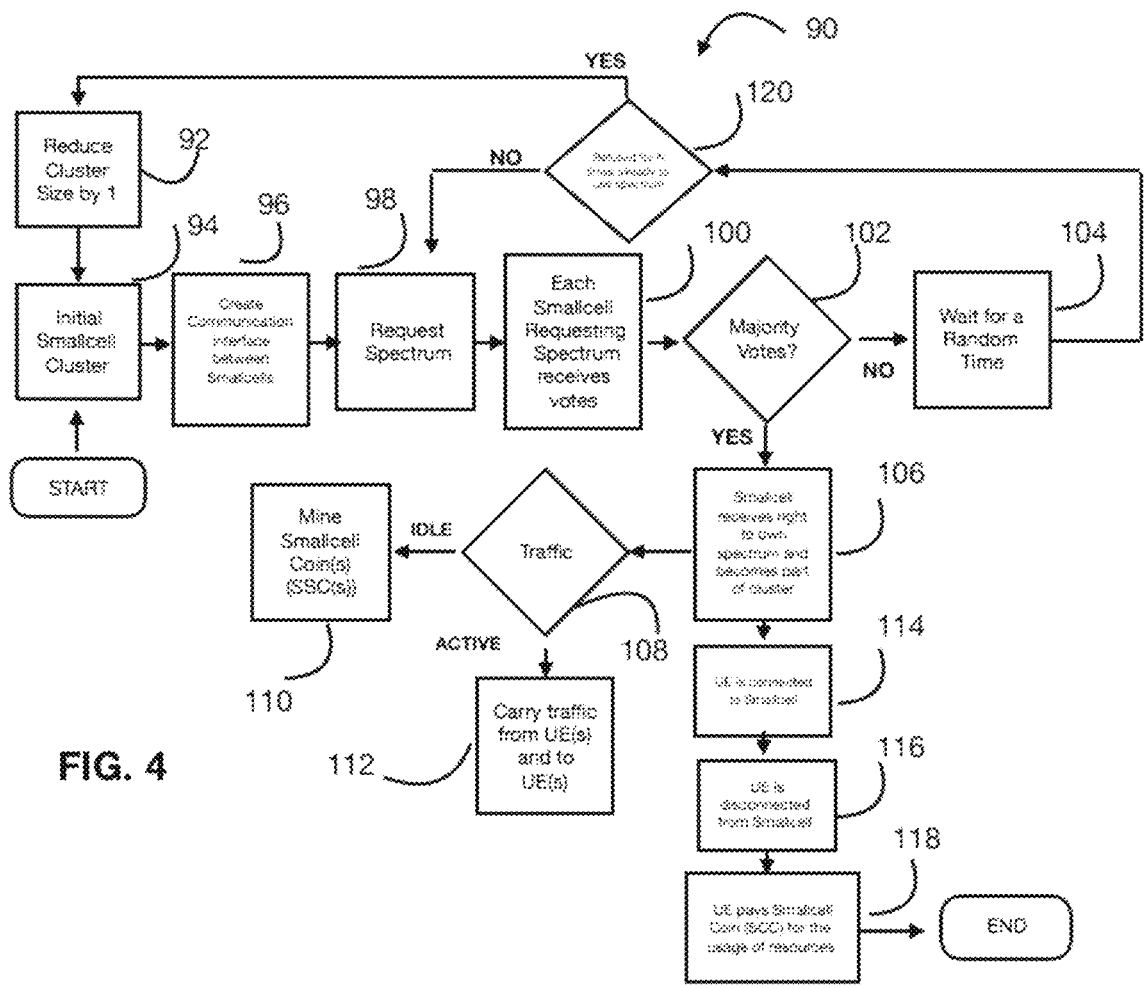
FIG. 4 is a flow-chart showing a method to deploy, optimize and manage the smallcell network.

FIG. 4 shows a method to deploy, optimize and manage the smallcell network.

FIG. 4 shows a method 90 of creating small cell network, and authorizing transactions. The method 90 may be implemented as a set of executable logic instructions stored in at least one machine- or computer-readable storage medium such as random access memory (RAM), read only memory (ROM), programmable ROM (PROM), flash memory, firmware, microcode, etc. in configurable logic such as, for example, programmable logic arrays (PLAs), field programmable gate arrays (FPGAs), complex programmable logic devices (CPLDs), in fixed functionality hardware using circuit technology such as, for example, application specific integrated circuit (ASIC), complementary metal oxide semiconductor (CMOS) or transistor logic (TTL) technology, or any combination thereof. For example, computer program code to carry out operations shown in the method 90 may be written in any combination of one or more programming languages, including an object-oriented programming languages such as "C" programming language or similar programming languages. Moreover, various aspects of the method 90 could be implemented as embedded logic of a processor using any of the aforementioned circuit technologies.

Illustrated processing block 94 defines the initial cluster size of smallcell network. Initial cluster size shows the number of smallcells in the same network of a cluster which communicates with each other through wireless and/or wireline links.

Processing block 96 shows that any smallcell which becomes part of the network creates communication links with other smallcells in the network. This communication link can be any wireless and/or wireline link.

Figure 5:
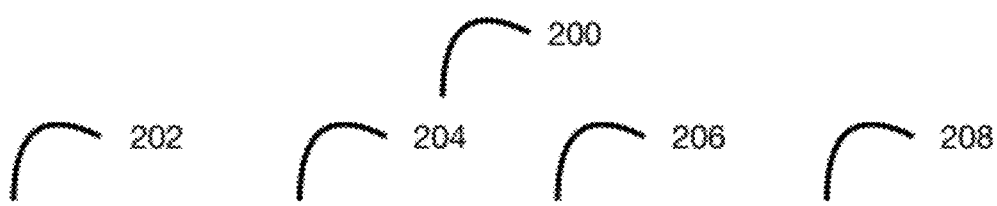
FIG. 5 is a chart showing the description of the Smallcell ID, Spectrum Amount, Location and Rent Duration

Processing blocks 98, 100 and 102 show the process of requesting the spectrum. Each smallcell requests a particular amount of spectrum far a particular amount of duration. This request is shared with other smallcells over communication interface 30, 32, 20, 50, 54, 52. Each smallcell inside the same network cluster votes for that request and sends the vote back to original smallcell requesting the spectrum resources. If at least half of the smallcells vote for YES (8 out of 15), spectrum resource is rented out to the requesting smallcell. Each smallcell holds a table that shows the spectrum in use, and spectrum not in use, and smallcell requests spectrum based on this real-time spectrum information in the table. FIG. 5, 200 shows an example of a spectrum lookup table held by each smallcell in smallcell network. Spectrum rent record is created if a particular smallcell is approved to use a frequency spectrum and/or range of frequency spectrum. Each record consists of duration of the rent of the spectrum 208, amount of the spectrum rented out to smallcell 204, location of the rent of the spectrum 206, smallcell identification 202 of the smallcell which owns and uses the spectrum. Each row of the table 200 shows data about the same smallcell, and different rows of the table show information regarding different smallcells.

Processing block 104 shows the procedure that when a smallcell is rejected to rent and utilize the spectrum, smallcell will wait for a random amount of time to make a request to rent the spectrum again, 98.

If a smallcell has been rejected N times already, this smallcell is not able to make a request to rent any amount of spectrum in the network of which smallcell wants to be part of. Therefore, smallcell will be removed from the smallcell network cluster and network cluster size will be reduced by 1, 92.

Processing block 106 shows that the spectrum will be rented to the smallcell who made the request to rent the spectrum 98 if other smallcells in the cluster give YES votes to the request to rent the spectrum. In other words, smallcell which is requesting the spectrum should receive majority of positive votes (YES) from other smallcells in the network cluster. Once smallcell owns right to transmit power in the spectrum rented, smallcell starts transmitting data to and from user terminals in its network coverage.

Processing block 114 shows that once smallcell's request to rent the frequency spectrum is approved, UEs which are in the radio frequency (RF) coverage of the smallcell recognize that this smallcell is a live and signal transmitting smallcell, and UEs make request to connect to this smallcell. User terminals recognize the smallcell as live and transmitting smallcell it user terminal can scan and read the physical cell identity (PCI) of the smallcell. Once user terminal completes all data transmission to smallcell, and also when smallcell completes all data transmission to the user terminal, user terminal will disconnect from the smallcell, 116.

Figure 6:
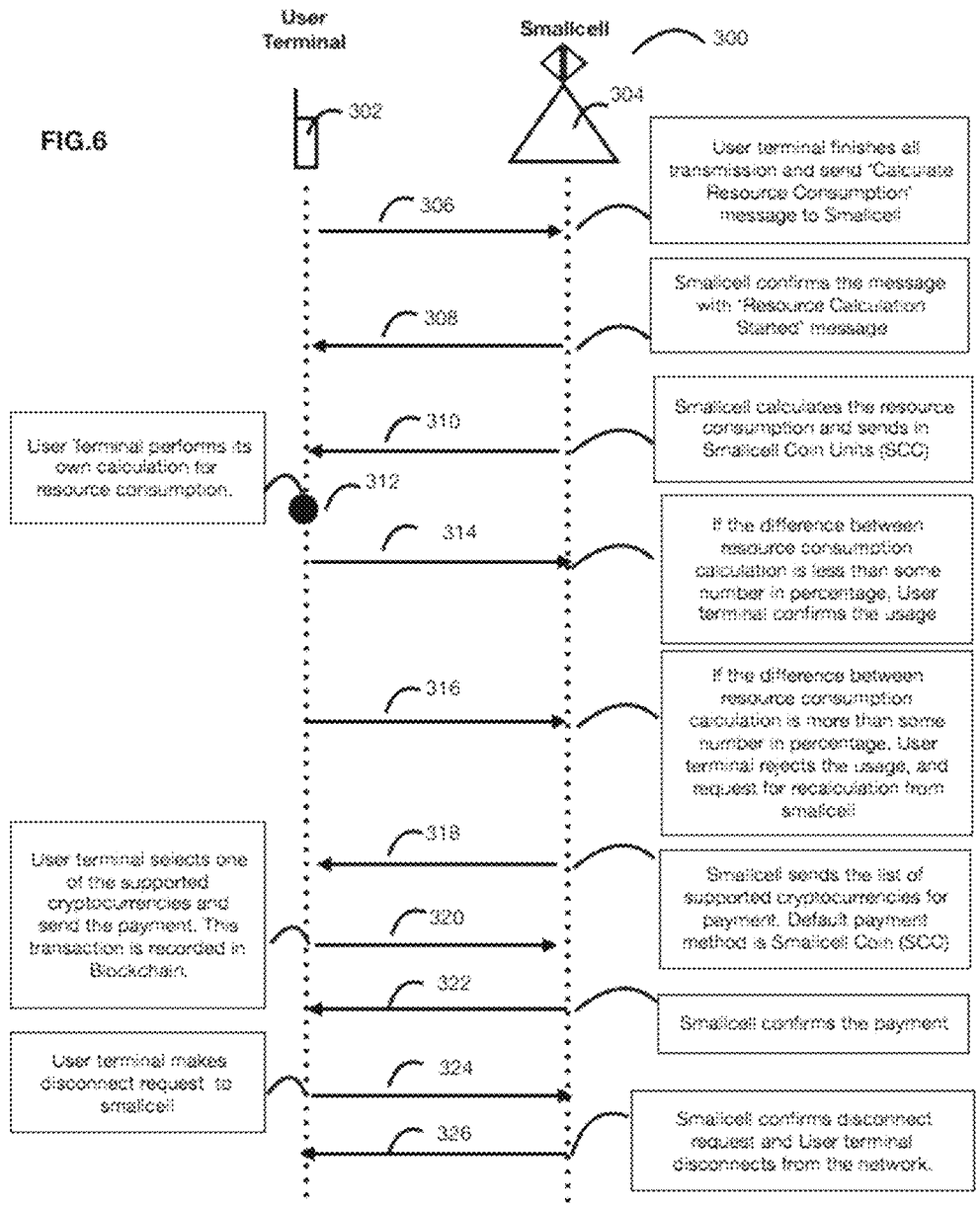
FIG. 6 is a flowchart showing the overall data exchange between user terminal and the smallcell.

Processing block 118 identifies the amount of all kind of network and smallcell resources used by user terminal, determines the payment method, and performs transaction to make the payment to smallcell for the amount of resources used during the data transmission from and to user terminal. FIG. 6 shows the overall data exchange between user terminal and the smallcell to perform the payment transaction and resource usage determination 300 shows signaling flow between user terminal and smallcell. User terminal 302 exchanges messages with smallcell 304 to determine the amount of resources consumed by user terminal. After user terminal completes the data transmission to and from the smallcell user terminal sends 'Calculate Resource Consumption' message 306 to smallcell. Smallcell confirms 'Calculate Resource Consumption' message by sending 'Resource Calculation Started' message 308 back to user terminal. As a next step, smallcell calculates amount of resources consumed by user terminal and sends message 310 with Smallcell Coin Units (SCC) information. After receiving Smallcell Coin Unit information from the smallcell, user terminal performs its own calculations 312 to calculate the amount of resources that user terminal has used during the connection and communication with smallcell. If the difference between the resource consumption calculations is less than some number, user terminal confirms the consumed amount 314. If the difference between the resource consumption calculations is more than some number, user terminal rejects the usage, and requests smallcell to recalculate the resource consumption 316. After smallcell resource consumption recalculations, if the difference between calculated number is still higher than some percentage, smallcell will ask for more information from user terminals. For example, smallcell asks for the time duration during which user terminal has been connected to the smallcell, and the moment of time that user terminal was disconnected from the smallcell. Smallcell investigates if there was any moment that user terminal lost data or voice connection with smallcell, this was not captured by smallcell. All the information that smallcell uses for further verification of the resource consumption amount, smallcell will ask user terminal to send its own log information. After resource consumption is confirmed by user terminal and as a next step, smallcell will send 318 the list of supported cryptocurrencies by this cluster of smallcell network. User terminal selects one and/or more cryptocurrencies and initiates the transaction towards smallcell 320. This transaction is recorded in smallcell blockchain 320. In order to record this transaction in blockchain, for user terminal, user terminal's International Mobile Subscriber Identifier (IMSI) number is used as private key in the block, and user terminal's phone number is used as public key in the block. For smallcell, combination of Medium Access Control (MAC) number is used as private key, and smallcell product serial number is used as public key in the blockchain. After payment is sent from user terminal to smallcell using blockchain technology, smallcell confirms the payment 322. After transaction is successfully completed, user terminal sends disconnection request 324 to smallcell. Smallcell confirms the disconnection request 326 and user terminal disconnects from smallcell and smallcell network.

Figure 7:
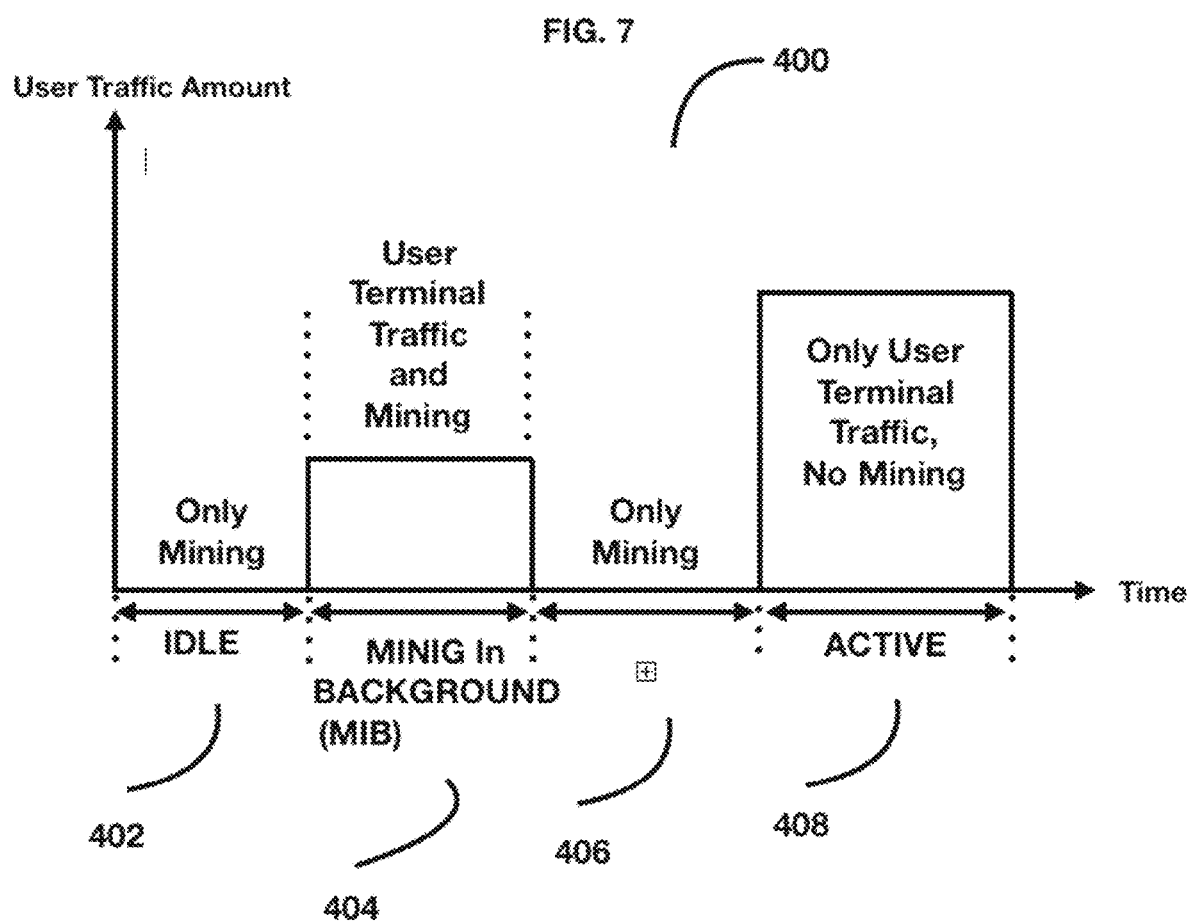
FIG. 7 is a graph showing the relationship be the USER TRAFFIC AMOUNT over TIME and the active state of a smallcell

Processing block 108 shows process that checks if smallcell has active traffic going to any user terminal and/or coming from any user terminal. If any user terminal traffic goes through the smallcell, smallcell is in ACTIVE state. FIG. 7 shows the active state 408 of a smallcell. Similarly, if there is no user terminal related traffic going through the smallcell, smallcell is in IDLE state 402, 406. There is also a third state which is Mining In the Background (MIB) state 404. In MIB state 404, smallcell has an active user terminal traffic, however this user terminal traffic is small and smallcell has hardware and software resources to mine Smallcell coin simultaneously while transmitting data to user terminal and receiving data from user terminal.

Figure 8:
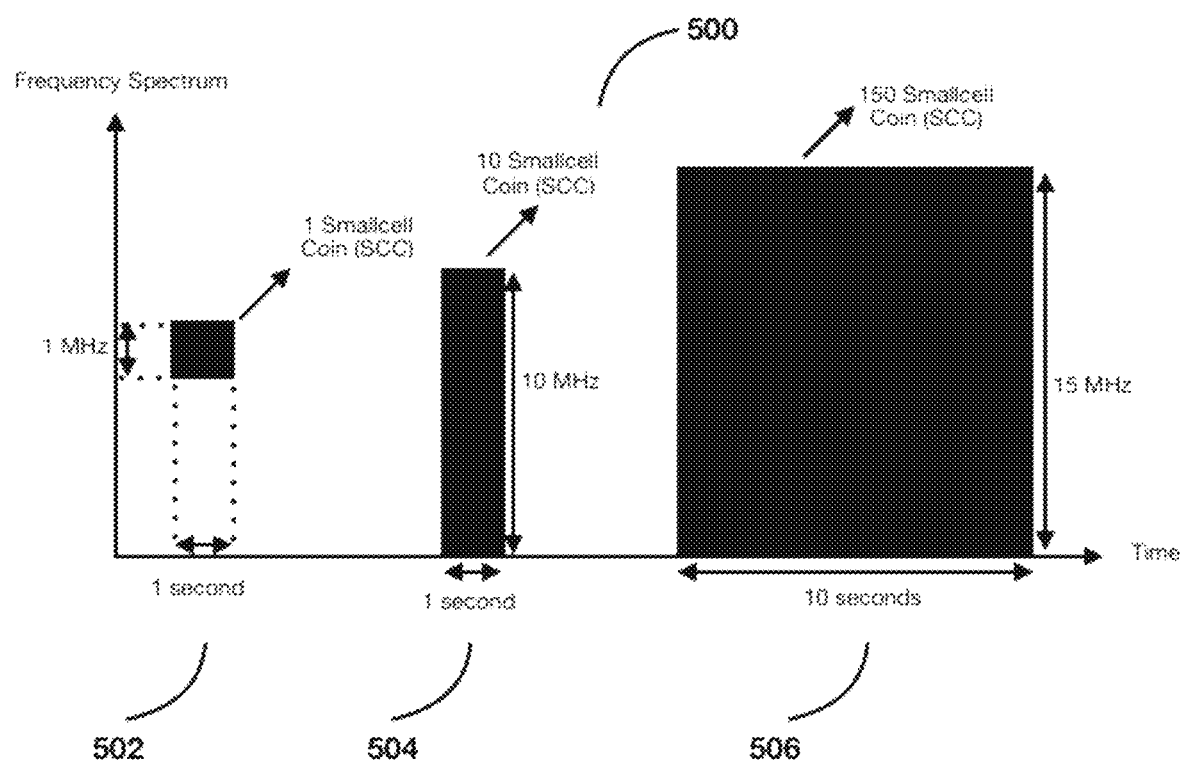
FIG. 8 is another graph showing the relationship between the Frequency Spectrum over time.

Processing block 110 shows the procedure that if smallcell is in IDLE state 402, 406, smallcell uses its hardware and software resources to mine the Smallcell Coin (SCC). FIG. 8 shows the number of Smallcell Coins that smallcell mines based on IDLE time and frequency available. For example, when smallcell is IDLE for 1 MHz and for 1 second, smallcell mines 1 smallcell coin (SCC) 502. If smallcell is IDLE for 10 MHz and 1 second, smallcell mines 10 smallcell coins (SCCs), 504. Similarly, if smallcell is IDLE for 15 MHz and 10 seconds, smallcell mines 150 Smallcell Coins (SCCs) 506.

For IDLE 1 hour (3600 seconds) of 10 MHz spectrum, each smallcell mines 36000 CC. Smallcell produces smallcell coin to use it for at least one of the payment to other smallcells, and payment for all services smallcell receives from other smallcells, from individuals, from people, from software centers, from hardware centers, from cloud centers, from data centers, from service providers, and from any party providing direct and indirect service to smallcells.

Figure 9:
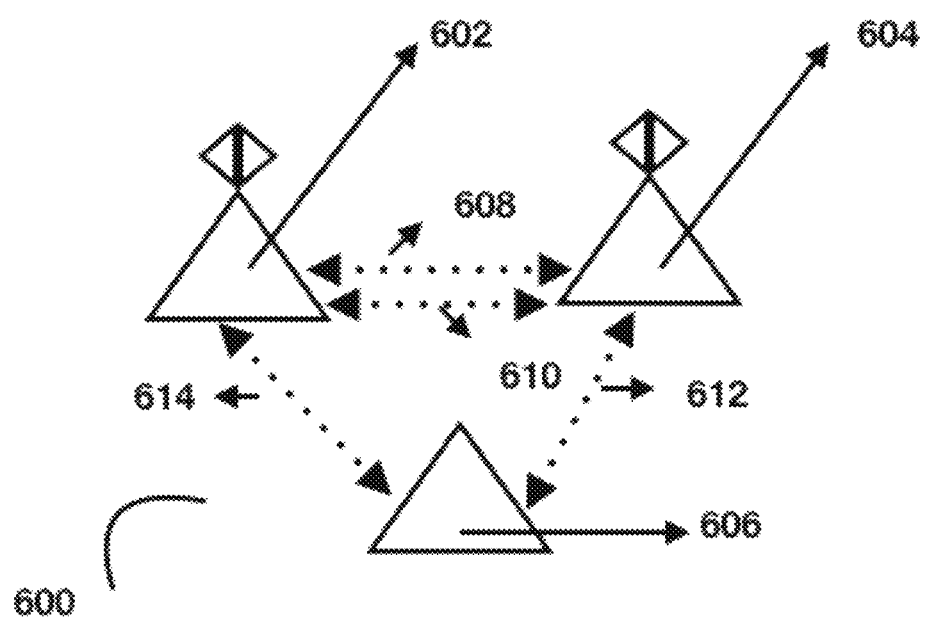
FIG. 9 is a schematic diagram showing the architecture of smallcell network

FIG. 9 shows the architecture of smallcell network 600 where two smallcells request the same amount of spectrum resources at the same time, where at that location there is only one set of spectrum resource available which is the spectrum resource two smallcells request to rent at the same time. Each smallcell requesting the spectrum to rent sends the request to all other smallcells in the network. Smallcell 602 requests to rent the spectrum and sends this request using link 608 to smallcell 604 and smallcell 606. Smallcell 604 request to rent spectrum and sends its request to smallcell 602 using the link 610 and sending the same request to smallcell 606 using the link 610.

Links between smallcells 602, 604, 606 are two-way links which means that each smallcell send information with other smallcell simultaneously. Each link is separate from the other link physically and/or logically. During the operation there might be some tie cases. One example tie case might be defined as, if there are 3 small cells in a particular cluster 600 and two of these small cells 602, 604 ask for exactly the same amount of spectrum resource for exactly the same amount of duration. When small cells send resource request to each other 608, 610, they will also create a random number and send this number as pan of their message. Each smallcell will check the resource request and if the resource request matches in terms of bandwidth and the time duration of the rent, smallcell which has the high random number will have access to the resources, if a smallcell has an access to resources in this tie breaking scenario, the smallcell who wins (has right to own the spectrum requested) at this time, will divide the generated random number by a pre-defined number in the next tie scenario. If smallcell does not win (no right to own the spectrum requested) at this time, in the next tie scenario smallcell will multiply the generated random number by a pre-defined number. And these divisions and multiplications will be increased and decreased by a pre-defined number at each time. This method creates fairness in owning the spectrum resources in smallcell network.

Figure 10:
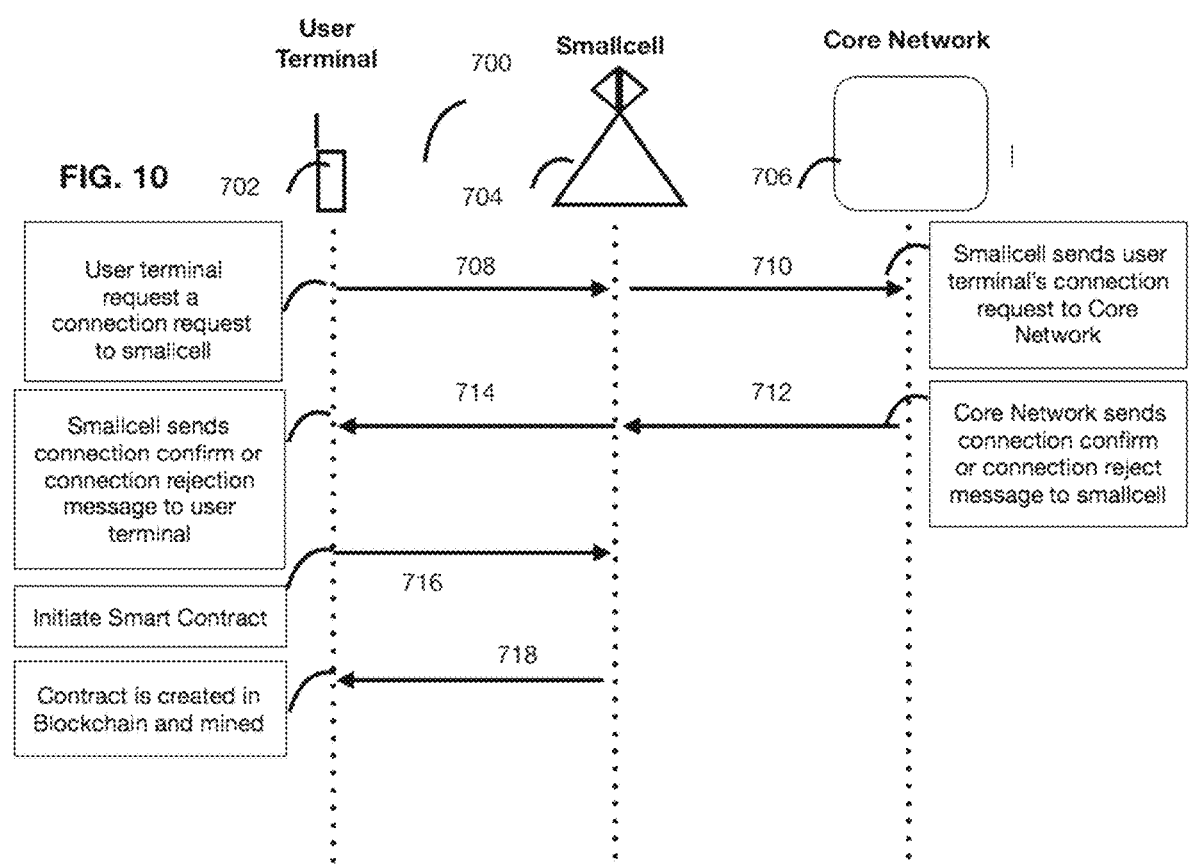
FIG. 10 is a flowchart showing how the user terminal sends a request to connect to smallcell

In FIG. 10, when user terminal 702 sends a request to connect to smallcell 704, smallcell 704 accepts the connection based on availability of its hardware and software resources, and at the same time, smallcell makes a resource request 710 to core network to carry user terminal's traffic. If smallcell's resource request is accepted 712, 714, user terminal will sign a smart contact 716 with the smallcell by using user terminal's International Mobile Subscriber Identification (IMSI) and user terminal's phone number. Smart contract is recorded as a block in a smallcell blockchain. IMSI is used as private key in recording smart contract in smallcell blockchain. User terminal's mobile phone number is used as public key in recording smart contract in smallcell blockchain. Smart contract between user terminal and smallcell will stay open as long as user terminal transmits and receives data. When user terminal finishes the data traffic, smart contract will be closed and payment will be made to the smallcell in terms of Smallcell Coin (SCC) using the procedures depicted in FIG. 6.

Figure 11:
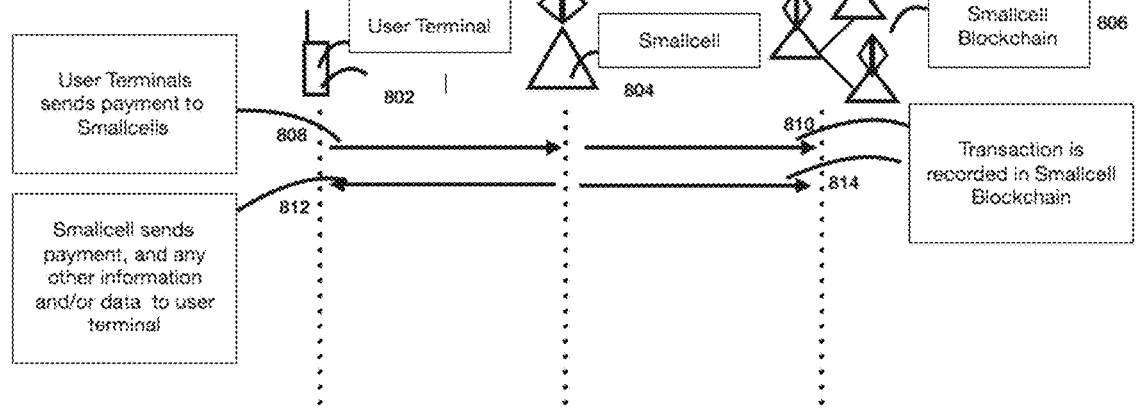
FIG. 11 is another flowchart showing that any payment, transaction, user and smallcell information, user and smallcell data, between user terminal and smallcell; and between smallcell and user terminal is recorded in smallcell blockchain.

FIG. 11 shows diagram that any payment 808, transaction 812, user and smallcell information 812, user and smallcell data 812, 808 between user terminal 802 and smallcell 804; and between smallcell 804 and user terminal is recorded 810, 814 in smallcell blockchain 806.

Figure 12:
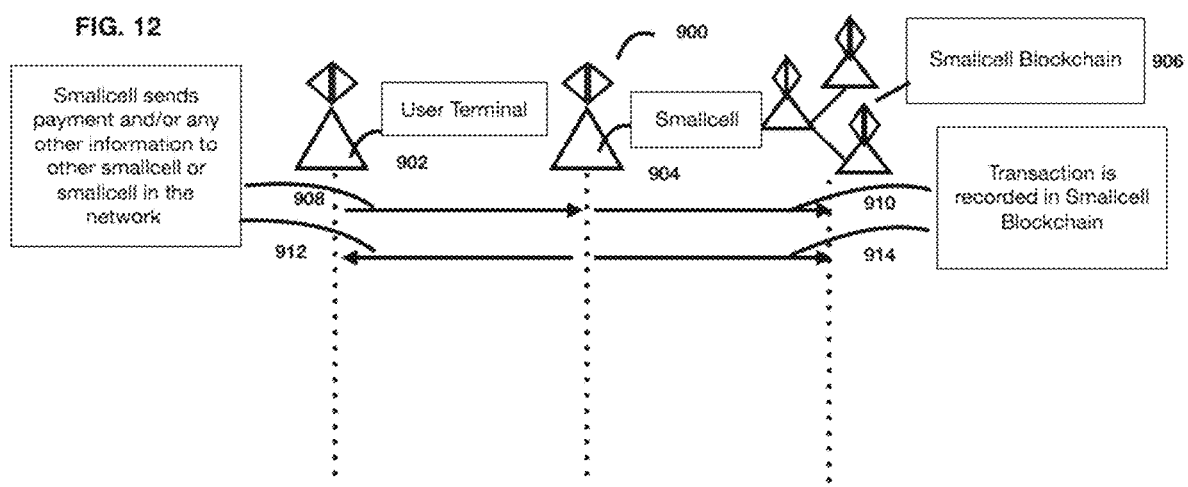
FIG. 12 is another flowchart showing that any payment, transaction, smallcell information, smallcell data between smallcell in the network is recorded in the smallcell blockchain.

FIG. 12 shows diagram that any payment 908, 912, transaction 908, 912, smallcell 902 information 908, 912, smallcell data between smallcells 902, 904 in the network is recorded 910, 914 in the smallcell blockchain 906.

FIG. 13 shows process flow to update the software of the smallcells in the network. When new software release 1002 is available in software development center, the feature list 1004 of this new software release is shared with smallcells in the network. Each smallcell in the network votes 1006 for each feature of this new software release. Each vote 1008 from each smallcell is recorded in smallcell blockchain. Smallcells voting positive for a particular feature 1010 pay 1 smallcell coin for each positive vote. If the total amount of smallcell coins is larger or equal price of the new software release 1012, each smallcell in the network saves old performance routers and key performance indicators 1016 which are recorded in smallcell blockchain. Each smallcell installs the new software 1018. Each smallcell creates new counters and key performance indicators based on the new installed software release and records all of the information in smallcell blockchain 1020. If the performance of the smallcell has improved, this new software release is kept in that smallcell 1022. If the performance of the smallcell has degraded after installing the new software release, smallcells reinstall the previous version of the software which was installed in the smallcell before the new software release 1024.

FIG. 14 shows software center 2002 and the part of a smallcell network 2000. Smallcells 2006, 2010, 2014, 2020, 2028, 2032 are connected to each other with a backhaul connection 2004, 2008, 2012, 2016, 2018, 2022, 2024, 2026, 2030. When a new release and/or updated release of software is available in the software center, this information pushed to a smallcell and/or a few smallcells in the network. When a new release and/or updated release of software is available in the software center, this information is pulled by a smallcell or a few of smallcells in the network. That is, the availability of new software release can be pulled from software center by smallcells and also can be pushed by software center to smallcells. When one smallcell knows that a new software release is available in the software center, this information is shared with other smallcells in the network through backhaul connection 2004, 2008, 2012, 2016, 2018, 2022, 2024, 2026, 2030 between smallcells. This backhaul connection can be wired, wireless, or any other type of communication medium. 2040 shows software feature score table which has ratings, votes for each software feature by each smallcell in the network. Each smallcell in the network has this table.

FIG. 15, 3000 shows charging ledger in smallcell blockchain. 3002 shows the time of recording the ledger in smallcell blockchain, 3004 shows phone number of subscriber (user terminal) which has been connected to a smallcell, 3006 shows IMSI number of subscriber (user terminal) which has been connected to a smallcell. 3008 shows unique identification number of smallcell. 3010 shows geographical location of smallcell in terms of latitude and longitude. 3012 shows if the service subscriber has received is normal service or emergency service or both. 3014 shows amount of consumed data, and amount of consumed voice minutes. 3016 is reserved for terminal type and quality of service (QoS) class.

FIG. 16, 4000 shows performance ledger used in smallcell blockchain. 4002 shows the time recording for the ledger. 4004 shows telephone number for subscriber (user terminal). 4006 shows IMSI of subscriber (user terminal). 4008 shows smallcell identification number which can be serial number of a smallcell and/or any other unique number that identifies smallcell. 4010 shows geographical location of smallcell in terms of latitude and longitude. 4012 shows quality index. Each subscriber (user terminal) connected to smallcell will send performance metrics at the end of the call. This is used to report performance to smallcell. Quality Index consists of counter and key performance indicators such as Amount of throughput per RRC Connected Instance (in kbps)/Average Channel Quality Indicator. Standard Deviation of throughput Per RRC Connected Instance (in kbps), Access Success Rate, Handover Success Rate. 4014 shows amount of consumed data and total number of voice minutes by subscriber user terminal), 4016 shows terminal type and quality of service (QoS) class.

The value of smallcell coin will be different based on at least one of the network operators owning and running the smallcell network, and based on the different vendors/manufacturers of smallcell. The value of smallcell coin will depend on Coverage, Capacity, Service Experience, Service Quality.

What is claimed is:

1. A method of deploying, optimizing and managing smallcell network with blockchain, the method comprising:

creating an initial smallcell network cluster with at least one of random number of smallcells and with pre-defined number of smallcells;

creating network connections among smallcells inside the network in an automated fashion;

smallcell requests amount of frequency bandwidth to use for an agreed duration of time and at the location of smallcell, and smallcell shares frequency bandwidth rent request with other smallcells in the same smallcell network over network connections created among smallcells;

smallcell receives positive or negative votes from at least two of other smallcells in smallcell network, and smallcells compare the number of positive and negative notes;

if the number of positive votes is equal or higher than the number of negative votes, smallcell rents or owns the frequency bandwidth for the agreed duration of time and at smallcell location;

if the number of positive votes is equal or higher than the number of negative votes, smallcell becomes the part of the smallcell network or smallcell starts transmitting radio frequency signal in the smallcell network;

smallcell repeats the renting request to rent the frequency bandwidth after waiting for a random amount of time if the number of negative votes is higher than the number of positive votes;

smallcell removes itself from the smallcell network if smallcell has already been refused N times to rent same and/or different amount of the frequency bandwidth;

smallcell removes the network connections with other smallcells in the smallcell network network if smallcell has already been refused N times to rent same and/or different amount of the frequency bandwidth;

smallcell creates a smart contract in smallcell blockchain with user terminals in order to transmit data to user terminals and to receive data from user terminals;

smallcell calculates the amount of smallcell network and smallcell resources during connection between user terminal and smallcell, and records the calculated resources utilization amount in the smallcell blockchain;

user terminal calculates the amount of smallcell network resources, user terminal resources, and smallcell resources used during the connection between user terminal and smallcell; and smallcell creates said smart contract with user terminals for the payment processing at the end of data connection between smallcell and the user terminals.

2. A method of mining the smallcell coin in a smallcell blockhain in smallcell network, the method consisting of:

smallcell mines the smallcell coin when smallcell does not transmit any information and data to user terminals and when smallcell does not receive any data from user terminals, and when smallcell does not exchange any data with other smallcells in smallcell network;

smallcell records the transaction in smallcell blockchain as part of an existing block and/or as a new block;

smallcell stores smallcell coin at the smallcell;

smallcell mines the smallcell coin when there is little user terminal related traffic in the smallcell;

smallcell uses smallcell coins to gain priority over other smallcells when a smallcell requests to rent the frequency bandwidth at the same time with at least one of the other smallcells in a smallcell network;

smallcell makes payment to an individual installer who installs and sets up the smallcell;

smallcell makes payment to an individual installer who fixes and places smallcell part or parts when smallcell or any part of smallcell needs replacement;

smallcell makes payment to 3-D printing facilities to print and to ship any hardware parts of the smallcell to replace the malfunctioning or broken parts of itself;

smallcell makes payment to software centers to write, to develop, and to test the new version of smallcell software;

smallcell makes payment to data centers who store, back up, process the performance, test, diagnostic data of smallcell;

smallcell records all of transactions in smallcell blockchain as part of an existing block or as a new block;

smallcell sends smallcell coins to other smallcells, and receives smallcell coins from other smallcells, and records the transaction in smallcell blockchain;

smallcell requests to upgrade the backhaul capacity of itself with smallcell coins, and smallcell pays for the upgraded backhaul with smallcell coin; and smallcell records at least one of the performance data, network optimization data, smallcell parameters, performance counters, and key performance indicators as part of an existing block or a new block in smallcell blockchain.

3. The method of claim 1 wherein said blockchain is a distributed database system that records every transaction using unique keys of parties involved in that transaction; said requesting amount of frequency bandwidth consists of checking the availability of requested spectrum in spectrum utilization table, sending request to rent specific amount of spectrum for specific duration of time at a specific location to other smallcells in the network; said renting spectrum means transmitting data in rented frequency spectrum for the agreed duration of time; said repeating the renting request means reseeding the request to rent frequency spectrum after waiting for an amount of randomly generated time; said removing itself from network means shutting down all live connections with other smallcells and said creating smart contract means signing a digital contract by recording smart contract as a block in smallcell blockchain.

4. The method of claim 2 wherein said mining smallcell coin means producing smallcell coins by using hardware and software resources of smallcells and said smallcell coin further is used by smallcells to rent frequency spectrum, and said smallcell coin is further used to do one of the following:

gain prioritization over at least one of the smallcells during frequency spectrum rent request;

pay individual contractors, people, and individual installers who change a part or parts of the smallcell in a smallcell network;

pay 3D printing facilities which manufacture a part or parts of the smallcell by creating smart contracts in smallcell blockchain;

pay autonomous driving vehicles, autonomous flying objects, planes, drones for delivery of a part or parts of smallcell to requested location of the smallcell by creating smart contracts between the smallcell and these autonomous driving vehicle, autonomous flying drone, objects, planes in smallcell blockchain;

pay software center which develops new and next release of smallcell's software, tests software, troubleshoots the software and delivers the software to smallcells by creating smart contracts between software center and smallcells in smallcell blockchain; and pay data center which stores, processes, analyzes any data coming from smallcells for any purpose, by creating smart contracts between data center and smallcells in smallcell blockchain.

5. The method of claim 2 wherein said upgrading backhaul capacity further consists of at least one of: measuring the current backhaul capacity, measuring the current traffic load, predicting the future backhaul capacity requirements, and increasing the capacity of backhaul, creating a new smart contract with existing and/or new backhaul connection provider, and recording smart contract in smallcell blockchain.

6. The method of claim 3 wherein said spectrum utilization table is a database held at each smallcell in the network and contains information about how much frequency spectrum is rented by a smallcell at a specific location in the network and how long the spectrum is rented by a smallcell at a specific location.

7. The method of claim 2 wherein said blockchain records information in ledger format where ledger contains nature of the transaction, type, and unique keys that identify the parties involved in the transaction, and said blockchain means a distributed database that records each block by a smallcell coin which is mined by at least one of single and multiple smallcells in the network.

8. The method of claim 2 wherein said transaction means any information and/or data sent from sender to transmitter in a smallcell network.

9. The method of claim 2 wherein said sender is at least one of the smallcells initiating the communication with at least one of other smallcells, and user terminal (subscriber) initiating the connection with the smallcell, and smallcell initiating the communication with other user terminal.

10. The method of claim 2 wherein said transmitter is the cell on the transmitting side of the communication such as smallcell and/or user terminal (subscriber).

11. The method of claim 2 wherein said unique keys is at least one of: the media access control (MAC) identification number and product identification number of a smallcell, the International Mobile Subscriber Identification (IMSI) and International Mobile Subscriber Identifier, and any other user terminal (subscriber) specific unique identification numbers.

12. The method of claim 4 wherein said media access control (MAC) identification number is used as private key used to record transaction in a smallcell blockchain.

13. The method of claim 4 wherein said product identification number is used as the public key used to record the transaction in a smallcell blockchain.

14. The method of claim 1 wherein said network deployment is the process of placing smallcells at optimum locations, and making smallcell a part of small cell group(s) and/or a smallcell cluster, and consists of a voting mechanism based on which a decision on whether a small cell will become part of the network or not is made.

15. The method of claim 1 wherein said optimization is at least one of: the process of improving network performance, process of enabling the communication between smallcell and user terminals (subscribers), and process of configuring smallcells with the required set of parameters.

16. The method of claim 15 wherein said network performance means changing and modifying the parameter(s) of a smallcell and/or smallcells, recording this change as part of at least one of existing block or a new block in smallcell blockchain.

17. The method of claim 15 wherein said configuring smallcell means at least one of adding, changing, deleting, modifying settings and parameters of a smallcell, recording all the changes as a new or existing block in the blockchain, and rolling back to the original settings and parameters values if smallcell performs worse than the before when settings and parameter values were not changed.

18. The method of claim 1 wherein said management means at least one of: managing smallcell failures, smallcell replacement, smallcell order, smallcell shipment, payment, user billing, recording any network management action as at least one of a new block and existing block in blockchain; measuring performance of a smallcell and recording it using performance ledger in smallcell blockchain; process of upgrading software release of the software running and executing in a smallcell.

19. The method of claim 18 wherein said smallcell failures means at least one of: a malfunctioning smallcell, a smallcell which does not work, a smallcell which does not transmit any data to user terminal, a smallcell which does not receive any data from a user terminal, and a smallcell which does not transmit any data to other smallcells in a smallcell network.

20. The method of claim 18 wherein said billing means at least one of transaction between subscribers and smallcells, transaction between smallcells; recording charging ledger in smallcell blockchain.

21. The method of claim 20 wherein said transaction between subscribers and smallcell means the payment from subscribers to smallcells using with at least one of smallcell coin and any type of cryptocurrency.

22. The method of claim 21 wherein said computer software means software that is responsible for executing all tasks performed in a smallcell.

23. The method of claim 18 wherein said upgrading means one of the following: pulling or downloading software from software center; center pushes software to a smallcell or smallcells; voting for feature list of software and paying one smallcell coin for each positive vote given to each feature of software; counting and summing all smallcell coins paid by smallcells by voting positively for a software feature or software features and paying for software by paying software license fee using smallcell coins and recording all these processes as at least one of block and blocks in a smallcell blockchain; and at least one of process of creating software, storing software, updating software and consists of the process of sharing software feature score table which has scores for each feature of software.

* * * * *